US011333830B2

(12) United States Patent
Lin (10) Patent No.: US 11,333,830 B2
(45) Date of Patent: May 17, 2022

(54) SILICON-BASED POLARIZATION BEAM SPLITTER

(71) Applicant: INPHI CORPORATION, Santa Clara, CA (US)

(72) Inventor: Jie Lin, Santa Clara, CA (US)

(73) Assignee: MARVELL ASIA PTE LTD., Singapore (SG)

( * ) Notice: Subject to any disclaimer, the term of this patent is extended or adjusted under 35 U.S.C. 154(b) by 338 days.

(21) Appl. No.: 16/274,826

(22) Filed: Feb. 13, 2019

(65) Prior Publication Data

US 2020/0257127 A1 Aug. 13, 2020

(51) Int. Cl.
*G02B 6/24* (2006.01)
*G02B 6/27* (2006.01)
*G02B 27/28* (2006.01)

(52) U.S. Cl.
CPC ......... *G02B 6/2773* (2013.01); *G02B 27/283* (2013.01)

(58) Field of Classification Search
CPC ............... G02B 27/283; G02B 6/2773; G02B 2006/12195; G02B 2006/12061; G02B 6/126; G02B 6/274; G02B 6/2813; G02B 5/3025; G02B 5/3033; G02F 1/133528
USPC ................................................... 359/483.01
See application file for complete search history.

(56) References Cited

U.S. PATENT DOCUMENTS 9,366,818 B1 * 6/2016 Lin ...................... G02B 6/2804
2017/0227710 A1 * 8/2017 Lamponi ............. G02B 6/2726

OTHER PUBLICATIONS

Yin, Mei, et al. "CMOS-Compatible and Fabrication-Tolerant MMI-Based Polarization Beam Splitter." Optics Communications, vol. 335, 2015, pp. 48-52. (Year: 2015).*
Ma, Y., & Huang, D. (2007). A Compact Silicon-on-Insulator MMI-based Polarization Splitter. 2007 IEEE/LEOS International Conference on Optical MEMS and Nanophotonics (Year: 2007).*
Optical multi-mode interference devices based on self-imaging: principles and applications by Soldano et al., Journal of Lightwave Technology, vol. 13, No. 4, pp. 615-627, 1995 (Year: 1995).*

* cited by examiner

*Primary Examiner* — Thomas K Pham
*Assistant Examiner* — Henry A Duong (57) ABSTRACT

The present application discloses a polarization beam splitter (PBS). The PBS includes a silicon substrate and a planar structure formed thereon characterized by an isosceles trapezoid shape with a first parallel side and a second parallel side connected by two tapered sides. The first parallel side has longer width than the second parallel side, both of which is separated by a length no greater than 100 μm along a line of symmetry bisecting the pair of parallel sides. The PBS further includes a pair of input ports coupled to the first parallel side and a pair of output ports coupled to the second parallel side. The planar structure is configured to receive an input light wave of any wavelength in C-band via one input port and split to a TE-mode light wave and a TM-mode light wave respectively outputting to the pair of output ports.

15 Claims, 5 Drawing Sheets

SILICON-BASED POLARIZATION BEAM SPLITTER

BACKGROUND OF THE INVENTION

The present invention relates to a silicon-photonics device. More particularly, the present invention provides a compact silicon-based polarization beam splitter, a method of making the same, and a silicon-photonics module integrated with the polarization beam splitter for wide-band application in DWDM communication system.

Over the last few decades, the use of broadband communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Large-scale photonic integrated circuits are becoming very promising for many applications, including next-generation optical networks, optical interconnects, dense wavelength division multiplexed (DWDM) systems, coherent transceivers, lab-on-chip, etc. Silicon-based photonics integrated circuits have also become very popular, because of their compatibility with mature CMOS (complementary metal-oxide-semiconductor) technologies with excellent processing control, low cost and high-volume processing. Furthermore, silicon-on-insulator (SOI) is widely used as substrates for making various silicon-photonics devices. It is well known that SOI waveguides are usually severely polarization-sensitive so that many polarization handling devices including polarization beam splitter have become very important components in polarization sensitive Si Photonics Circuit.

For example, a compact polarization beam splitter made by a simple and high tolerance process on SOI substrate and designed to be easily integrated with other silicon-photonics devices becomes a crucial component for Dense Wavelength Division Multiplexing (DWDM) communication in wide spectrum range like C-band or O-band. Prior approaches of making the silicon-based polarization beam splitter for silicon-photonics modules are mostly process intolerant, high-reflection loss, bandwidth limitation, non-compatible with standard 220 nm SOI platform, too-long to be integrated with other silicon-photonics devices.

Therefore, it is desired to develop improved polarization beam splitter with compact, wavelength insensitive, balanced splitting, low reflection loss, process-robust, and easy for integrating with silicon-photonics devices for applications in wide band DWDM communication system.

BRIEF SUMMARY OF THE INVENTION

The present invention relates to photonic broadband communication device. More particularly, the present invention provides a compact silicon-based polarization beam splitter. More specifically, a silicon taper-shaped Multi-mode Interferometer (MMI) broadband polarization beam splitter (PBS) for C-band is provided. Additionally, the disclosure provides a method of making the PBS, and a silicon-photonics module integrated with the PBS for wide-band DWDM communication system, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a polarization beam splitter based on a silicon multi-mode interferometer. The polarization beam splitter includes a silicon substrate and a planar structure formed on the silicon substrate and characterized by an isosceles trapezoid shape with a first parallel side and a second parallel side connected by two tapered sides. The first parallel side and the second parallel side are separated by a length no greater than 100 μm along a line of symmetry bisecting the pair of parallel sides. The first parallel side has a first width being greater than a second width of the second parallel side. The polarization beam splitter further includes a pair of input ports coupled to the first parallel side respectively edge-aligned to two tapered sides of the planar structure in the isosceles trapezoid shape. Additionally, the polarization beam splitter includes a pair of output ports coupled to the second parallel side respectively edge-aligned to the two tapered sides. The planar structure is configured to receive an input light wave of any wavelength in C-band via one input port and split to a Transverse Electric (TE) mode light wave and a Transverse Magnetic (TM) mode light wave respectively outputting to the pair of output ports.

In an alternative embodiment, the present invention provides a method for forming a silicon-based polarization beam splitter. The method includes providing a silicon-on-insulator substrate having a silicon layer of a thickness. Additionally, the method includes patterning a first isosceles trapezoid shape in the silicon layer. The first isosceles trapezoid shape is characterized by a first parallel side and a second parallel side connected by two tapered sides. The first parallel side and the second parallel side are separated by a length no greater than 100 μm along a line of symmetry bisecting the pair of parallel sides. The first parallel side has a first width being greater than a second width of the second parallel side. The method further includes forming a first plate structure having the same thickness of the silicon layer substantially based on the first isosceles trapezoid shape. Furthermore, the method includes forming a pair of input ports from the same silicon layer to join with the first plate structure at the first parallel side substantially edge-aligned with respective two tapered sides. Moreover, the method includes forming a pair of output ports from the same silicon layer to join with the first plate structure at the second parallel side substantially edge-aligned with respective two tapered sides.

In another alternative embodiment, the method further includes patterning a second isosceles trapezoid shape and a third isosceles trapezoid shape in the silicon layer at a same time of patterning the first isosceles trapezoid shape and each tapered shape for each input port and each output port. Additionally, the method includes forming a second plate structure and a third plate structure respectively based on the second isosceles trapezoid shape and the third isosceles trapezoid shape. The second plate structure has one input port coupled to a first output port of the first plate structure and another input port being terminated. The third plate structure has one input port coupled to a second output port of the first plate structure and another input port being terminated. Furthermore, the method includes forming a first pair of output ports coupled to the second plate structure, which is substantially similar to the first plate structure, and one of the first pair of output ports that is a cross port relative to the first output port of the first plate structure being configured to output primarily the TE mode light wave with a two-stage extinction ratio at least greater than 60 dB. Moreover, the method includes forming a second pair of output ports coupled to the third plate structure, which is substantially similar to the first plate structure, and one of the second pair of output ports that is a bar port relative to the second output port of the first plate structure being configured to output primarily the TM mode light wave with a two-stage extinction ratio at least greater than 60 dB.

Many benefits of the silicon-based polarization beam splitter (PBS) can be achieved with the present invention based on Multi-mode Interferometer (MMI) on SOI platform. As an example, the SOL platform is fully compatible with CMOS technology, which substantially makes the process of making the PBS a robust one and the PBS itself can be made to be very compact with relaxing manufacturing tolerance due to MMI structure. Full silicon-based PBS can be well suited for integrating with other silicon-photonics devices flexibly. High performance with low loss and high extinction ratio and compact size allow the PBS to be cascaded in two stages to provide higher extinction ratio. Also, it has low polarization dependent loss and very suitable for polarization sensitive DWDM communication system for wide range of wavelengths in C-band. Similar design of the Si MMI-based polarization beam splitter shall be applied to O-band.

The present invention achieves these benefits and others in the context of disclosed polarization beam splitter based on a tapered MMI structure on SOI substrate. A further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present invention relates to photonic broadband communication device. More particularly, the present invention provides a compact silicon-based polarization beam splitter. More specifically, a silicon taper-shaped Multi-mode Interferometer (MMI) broadband polarization beam splitter (PBS) for C-band is provided. Additionally, the disclosure provides a method of making the PBS, and a silicon-photonics module integrated with the PBS for wide-band DWDM communication system, though other applications are possible.

Conventional polarization beam splitter based on multi-mode interferometer (MMI) combined with Mach-Zehnder interferometer (MZI) requires polarization insensitive design for the silicon 2×2 MMI, which is difficult to achieve and process highly in-tolerant. It also requires balanced splitter for TM mode, which is not realized in real product. Additionally, the traditional Si 2×2 MMI design is based on thick silicon layer that is greater than 350 nm in thickness and does not work in the state-of-art planarized photonics process based on standard 220 nm silicon-on-insulator (SOI) platform. Also, an obvious drawback of the traditional Si 2×2 MMI based PBS is too long to be integrated in compact silicon photonics module. Alternatively, the existing PBS made by silicon-based direct coupler combined with MZI has long size and bandwidth limited, which is not suited for wide-band communication application. In particular, the direct coupler based PBS is very sensitive to critical dimension, resulting in a very intolerable fabrication process.

In an aspect, the present disclosure provides a silicon-based, simply-design, multi-mode interferometer polarization beam splitter (PBS) in C-band for integration with silicon-photonics modules. The PBS is capable of being made substantially with a CMOS process based on standard 220 nm SOI platform. The following description of the PBS of the present invention is to enable one of ordinary skill in the art to make and use the invention and to incorporate it in the context of particular silicon photonics applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1:
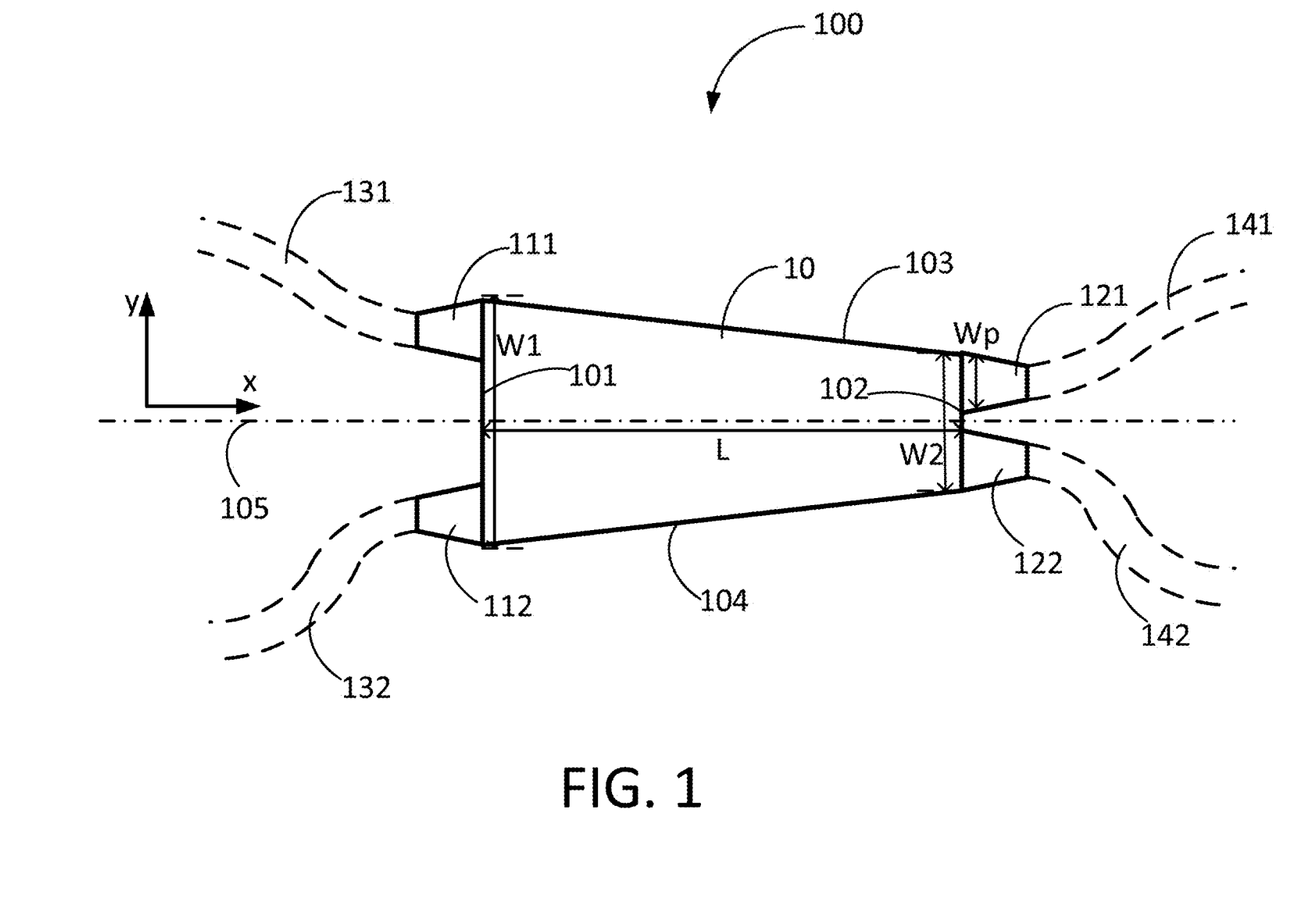
FIG. 1 is a simplified top view of a silicon-based polarization beam splitter according to an embodiment of the present invention.

FIG. 1 is a simplified top view of a silicon-based polarization beam splitter according to an embodiment of the present invention. This diagram is merely an example, which should not unduly limit the scope of the claims. One of ordinary skill in the art would recognize many variations, alternatives, and modifications. As shown, a silicon-based polarization beam splitter 100 includes a planar structure 10 in an isosceles trapezoid shape with a first parallel side 101 and a second parallel side 102 connected by two tapered sides, 103 and 104. The first parallel side 101 and the second parallel side 102 are separated by a length L along a line of symmetry 105 bisecting the pair of parallel sides. The first parallel side 101 has a first width W1 being greater than a second width W2 of the second parallel side 102. Optionally, the planar structure 10 is made by silicon. Optionally, the planar structure 10 is formed on a silicon substrate. Optionally, the silicon substrate is a silicon-on-insulator (SOI) substrate. Optionally, the SOI substrate has a standard silicon layer of 220 nm in thickness. Optionally, the planar structure 10 is made from the silicon layer of the standard thickness of 220 nm. Optionally, the planar structure 10 is made through a process fully compatible with CMOS process based on SOI platform. Optionally, the length L is limited to no greater than 100 μm, or no greater than 70 μm, or no greater than 50 μm. Optionally, the first width W1 and the second W2 are about 4 μm or less. Optionally, the first width W1 and the second W2 are about 3 μm or less. Optionally, the first width W1 and the second W2 are about 2 μm or less.

Referring to FIG. 1, the silicon-based polarization beam splitter 100 includes a first pair of optical ports 111 and 112 respectively joined with the first parallel side 101 of the planar structure 10, and further includes another pair of optical ports 121 and 122 respectively joined with the second parallel side 102 of the planar structure 10. In the embodiment, each optical port 111 or 112 is characterized in tapered shape with a longer width attached to the first parallel side 101 and each optical port 121 or 122 is also characterized in tapered shape with a longer end attached to the second parallel side 102. Additionally, the respective one port 111 or 112 is edge-aligned with the respective tapered side 103 or 104 of the planar structure 10. Similarly, the respective one port 121 or 122 is edge-aligned with the respective tapered side 103 or 104 of the planar structure 10. Referring to FIG. 1, the port 121 is a cross port relative to the port 112 and the port 122 is a bar port relative to the port 112. Optionally, each of these two pairs of optical ports is made from a same CMOS process simultaneously based on a single SOI substrate. In some embodiments, the planar structure 10 plus the four optical ports forms a 2×2 multi-mode interferometer (MMI) with a same thickness based on standard 220 nm silicon layer on SOI substrate. Given the dimensions provided earlier, the MMI has a very compact size under the standard 220 nm thickness SOI platform.

Referring to FIG. 1, each optical port, 111, 112, 121, and 122, is respectively configured to couple with a silicon waveguide, 131, 132, 141, and 142. Optionally, each silicon waveguide is naturally extended from a shorter end of the respective one optical port in tapered shape and formed in a same CMOS process on the SOI substrate. In an embodiment, at least one silicon waveguide, for example, waveguide 132, is used to guide an input light wave through one of the first pair of optical ports, for example, port 112 serving as an input port, into the planar structure 10 which is configured to be a 2×2 MMI. In the embodiment, the input light wave is an all-polarization light wave and is subjected to multi-mode scattering within the planar structure 10. In the embodiment, another optical port 111 of the first pair of optical ports is terminated (substantially without receiving any light wave from the silicon waveguide 131. In the embodiment, two of the second pair of optical ports 121 and 122 will serve as two output ports. In the embodiment, the port 121 is a cross port relative to the input port 112 and the port 122 is a bar port relative to the input port 112.

Figure 2:
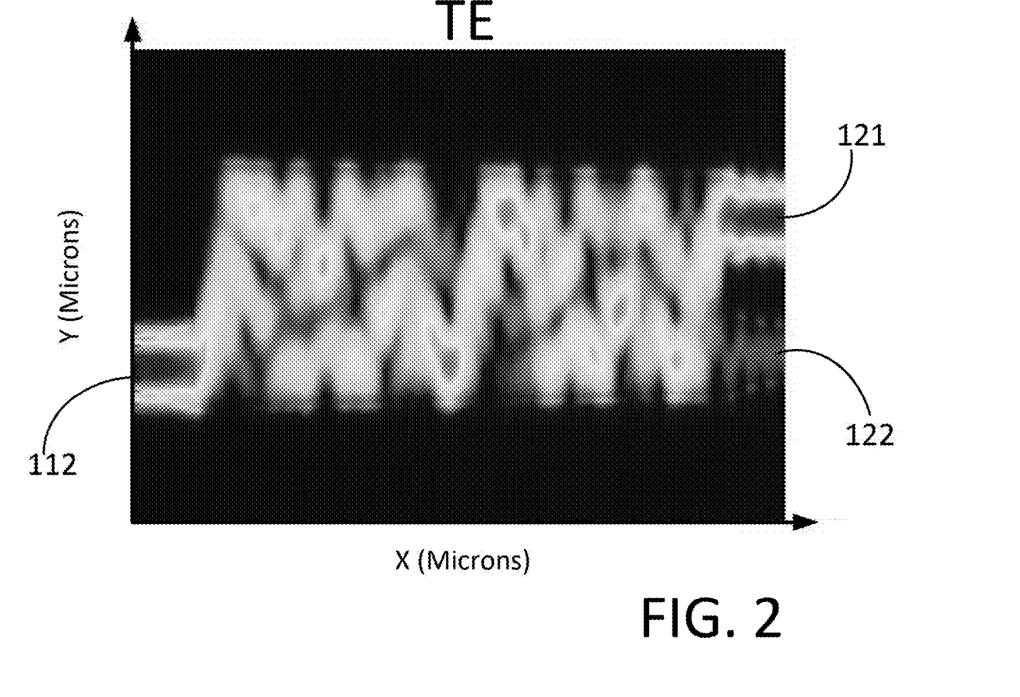
FIG. 2 is an exemplary diagram of TE-mode light wave interference map in the silicon-based polarization beam splitter according to an embodiment of the present invention.

FIG. 2 is an exemplary diagram of TE-mode light wave interference map in the silicon-based polarization beam splitter according to an embodiment of the present invention. This diagram is merely an example, which should not unduly limit the scope of the claims. One of ordinary skill in the art would recognize many variations, alternatives, and modifications. As shown, the scattering/interference intensity of light wave of transverse electric (TE) mode confined within the planar structure is mapped. Through the length of the planar structure, the TE-mode light wave scattered back and forth with varying intensities and phases at different locations. The relative darker color portion represents higher intensity of TE-mode light wave. At the second parallel side, the TE-mode light wave substantially forms a self-image, showing that the TE-mode light wave from the port 112 is primarily outputted through the port 121 with much lower proportion being outputted through the port 122. Optionally, the length L of the planar structure is in a range of 90 to 100 μm, or in a range of 80 to 90 μm, or in a range of 70 to 80 μm, or in a range of 60 to 70 μm, or in a range of 50 to 60 μm, or in a range of 40 to 50 μm. Optionally, the width (W1 or W2) is about 4 μm, or 3 μm, or 2 μm or less, wherein W1 is larger than W2. Any dimensions of L, W1, and W2 for defining the planar structure for forming the polarization beam splitter in C-band are set under a condition that the thickness of the planar structure is kept at 220 nm based in standard silicon layer of the SOI substrate.

Figure 3:
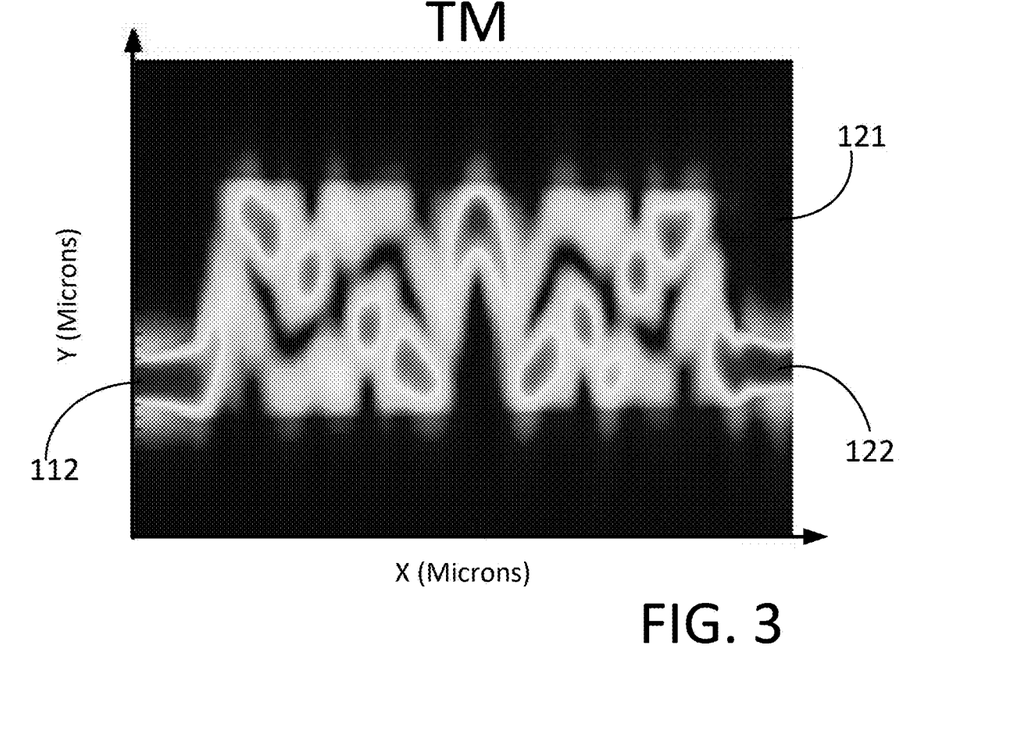
FIG. 3 is an exemplary diagram of TM-mode light wave interference map in the silicon-based polarization beam splitter according to an embodiment of the present invention.

FIG. 3 is an exemplary diagram of TM-mode light wave interference map in the silicon-based polarization beam splitter according to an embodiment of the present invention. This diagram is merely an example, which should not unduly limit the scope of the claims. One of ordinary skill in the art would recognize many variations, alternatives, and modifications. As shown, the scattering/interference intensity of light wave of transverse magnetic (TM) mode confined within the same planar structure is mapped. Through the length of the planar structure, the TM-mode light wave scattered back and forth with varying intensities and phases at different locations. The relative darker color portion represents higher intensity of TM-mode light wave. At the second parallel side, the TM-mode light wave substantially forms a self-image, showing that the TM-mode light wave from the port 112 is primarily outputted through the port 122 with much lower proportion being outputted through the port 121.

Figure 4:
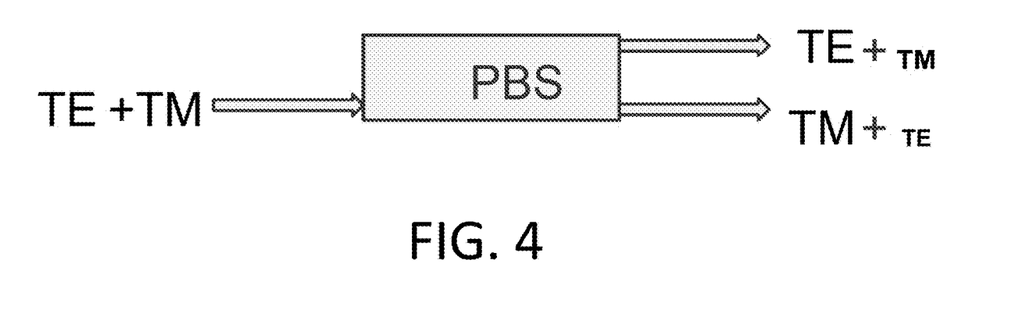
FIG. 4 is a schematic functional diagram of the polarization beam splitter according to some embodiments of the present invention.

In the embodiment, combining both FIG. 2 and FIG. 3, as an all-polarization light wave is inputted from the silicon waveguide 132 via the input port 112, the TE-mode and TM-mode in the input light wave are substantially split with the TE-mode light wave being outputted to the cross port 121 while the TM-mode light wave being outputted to the bar port 122. In other words, the silicon-based 2×2 MMI planar structure forms substantially a polarization beam splitter (PBS). FIG. 4 is schematic functional diagram of the polarization beam splitter according to some embodiments of the present invention. As shown, an input light wave containing mixed TE-mode and TM-mode is inputted to one input port (with a second input port of the MMI being terminated and not shown) and split by the PBS to a first output with primarily TE-mode and minor TM-mode and a second output with primarily TM-mode and minor TE-mode. The first output exits through a cross port relative to the input port and the second output exits through a bar port relative to the input port. Referring to FIG. 1 through FIG. 4, the PBS is substantially the planar structure 10 with the input port being put to port 112 (with port 111 being terminated although the port 111 can be used as an input port while the port 112 being terminated) and the first output port being the cross port 121 and the second output port being the bar port 122. In terms of optical power, the transmission loss of TE-mode light from the input port 112 to the cross port 121 is substantially small, while the transmission loss of TE-mode light from the input port 112 to the bar port 122 is quite large. The transmission loss of TM-mode light from the input port 112 to the respective bar port 122 is substantially small, while quite large from the input port 112 to the cross port 121. In the embodiment, the planar structure 10 of FIG. 1 is specifically configured with the isosceles trapezoid shape with the first parallel side coupled with the input port being greater than the second parallel side coupled with the output ports, yielding at least the following advantages, i.e., 1) a compact dimension of the MMI structure that provides a polarization TE/TM modes split function with low loss and high extinction ratio, 2) a substantially suppressed reflection loss inside the planar structure, and 3) the above two advantages being extended to a wide range of wavelengths such as entire C-band. More testing results will be shown below to illustrate these advantages.

Figure 5:
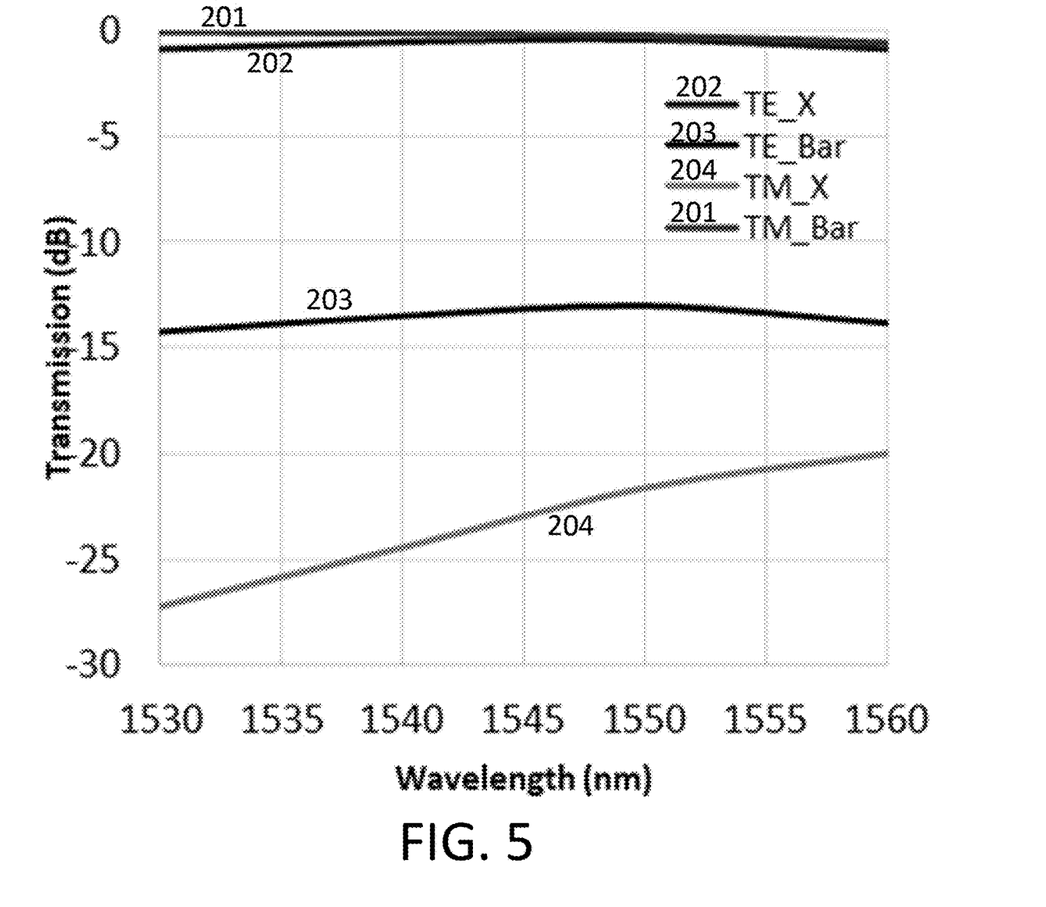
FIG. 5 is an exemplary diagram of optical transmission loss for all wavelengths in C-band from 1530 nm to 1560 nm for both TE mode and TM mode through the polarization beam splitter according to an embodiment of the present invention.

FIG. 5 is an exemplary diagram of optical transmission loss for all wavelengths in C-band from 1530 nm to 1560 nm for both TE mode and TM mode through the polarization beam splitter according to an embodiment of the present invention. Referring to FIG. 5, the transmission loss TE_X of the TE-mode light wave from input to cross output of a PBS according to the present invention versus C-band wavelengths from 1530 nm to 1560 nm is plotted as curve 202. The transmission loss TM-Bar of the TM-mode light wave from input to bar output of the PBS versus C-band wavelengths from 1530 nm to 1560 nm is plotted as curve 201. Both curves 201 and 202 show very small power loss (<1 dB) over all wavelengths in C-band, suggesting that the PBS split the TE and TM modes to let TE-mode exit to the cross port and the TM-mode exit to the bar port. At the same time, the transmission loss TE Bar of the TE-mode light wave from input to the bar output of the PBS according to the present invention versus C-band wavelengths from 1530 nm to 1560 nm is plotted as curve 203. The transmission loss TM-X of the TM-mode light wave from input to the cross output of the PBS versus C-band wavelengths from 1530 nm to 1560 nm is plotted as curve 204. Both curves 203 and 204 show substantially large power losses over all wavelengths across the C-band. For curve 203, the loss is at least greater than −13 dB at about 1550 nm. For curve 204, the loss is greater than −20 dB at about 1560 nm and even greater than −27 dB at about 1530 nm. Based on the transmission losses for the TE-mode or TM-mode through either the cross port or bar port given in FIG. 5, a TE or TM extinction ratio of each output port can be determined. In particular, at the cross port, the TM extinction ratio is more than 25 dB and at the bar port, the TE extinction ratio is also more than 25 dB, for all wavelengths across entire C-band.

Figure 6:
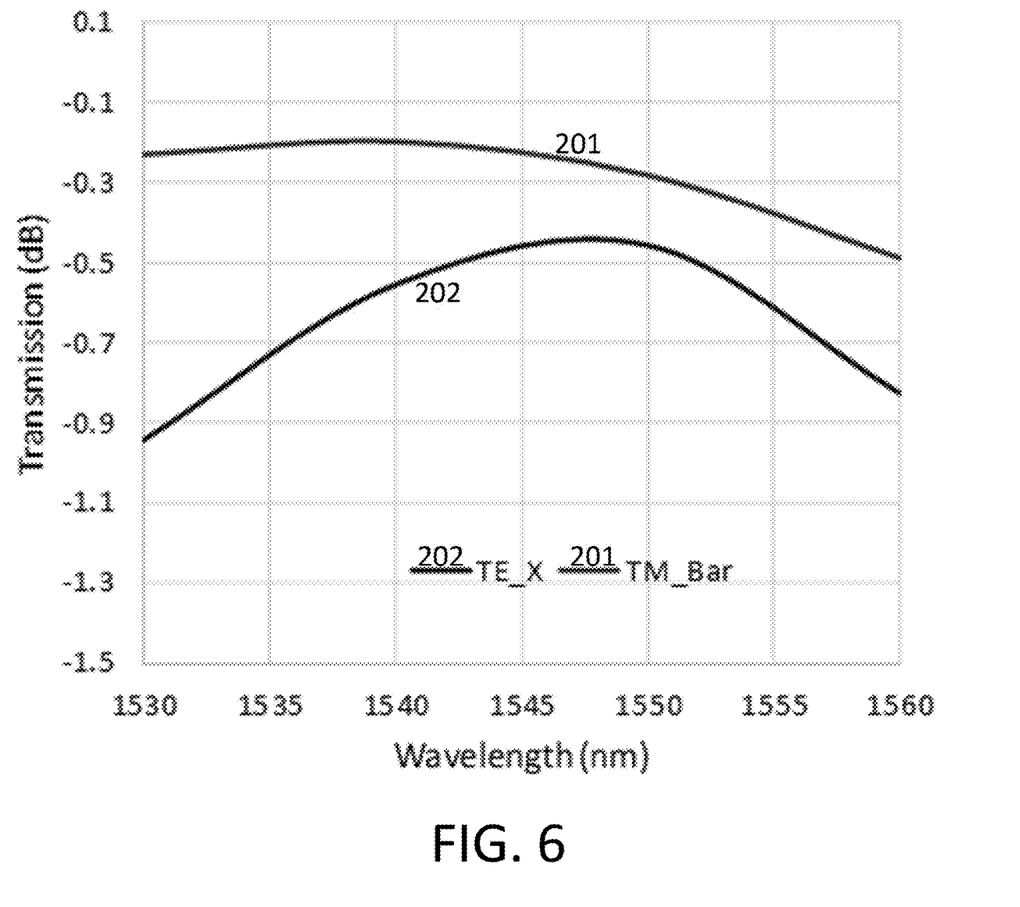
FIG. 6 is an exemplary diagram of a detailed transmission loss for all wavelengths in C-band from 1530 nm to 1560 nm for TE mode at Cross port and TM mode at Bar port through the polarization beam splitter according to an embodiment of the present invention.

FIG. 6 is an exemplary diagram of a detailed transmission loss for all wavelengths in C-band from 1530 nm to 1560 nm for TE mode at Cross port and TM mode at Bar port through the polarization beam splitter according to an embodiment of the present invention. Referring to FIG. 6, curves 201 and 202 in FIG. 5 are shown again in spread scale of Transmission Loss. As seen, the loss for the TE-mode at cross port is relatively flat across the C-band and smaller than −0.5 dB. The loss for the TM-mode at the bar port is slightly bigger but just slightly over −0.9 dB at 1530 nm.

Figure 7:
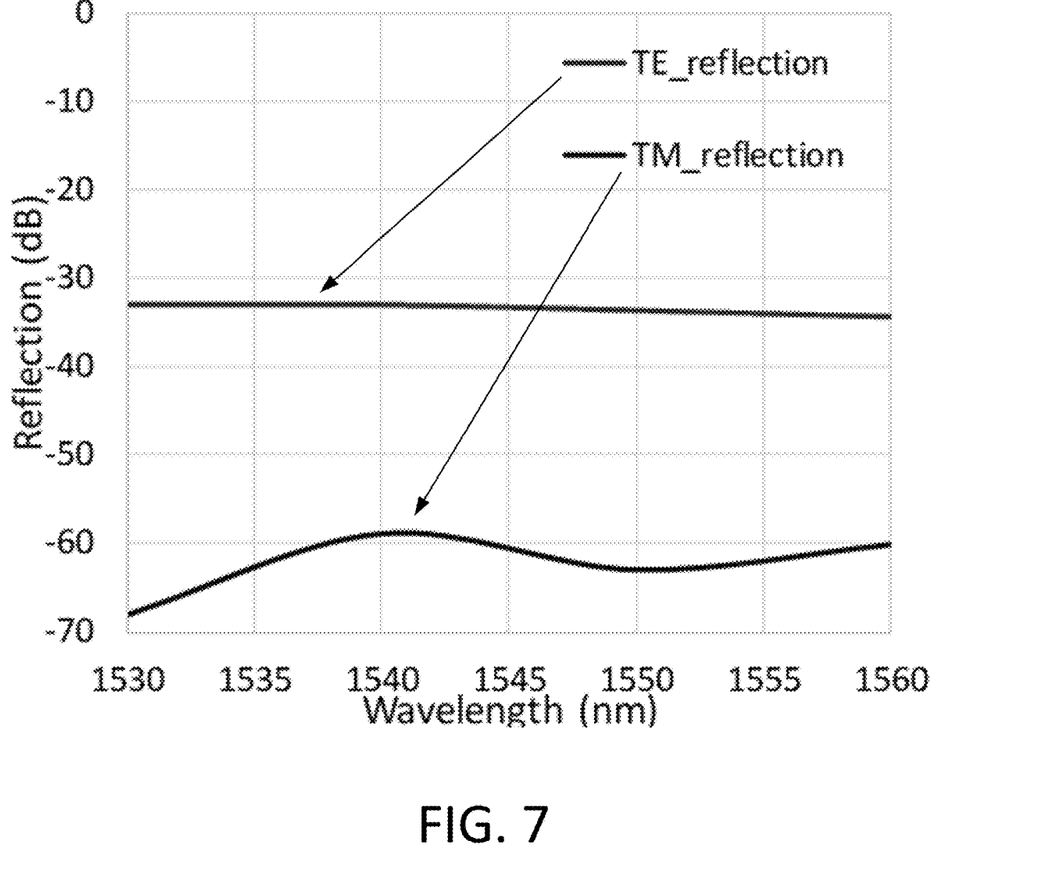
FIG. 7 is an exemplary diagram of optical reflection loss for all wavelengths in C-band from 1530 nm to 1560 nm for both TE mode and TM mode in the polarization beam splitter according to an embodiment of the present invention.

FIG. 7 is an exemplary diagram of optical reflection loss for all wavelengths in C-band from 1530 nm to 1560 nm for both TE mode and TM mode in the polarization beam splitter according to an embodiment of the present invention. Referring to FIG. 7, optical reflection power loss of the TE-mode light wave in the PBS (particularly from the cross port 121 of the PBS 100 of FIG. 1) according to the present disclosure is very large at about −33 dB. Additionally, FIG. 7 shows that optical reflection power loss of the TM-mode light wave in the PBS (particularly from the bar port 122 of the PBS 100 of FIG. 1) according to the present disclosure is even bigger, at more than −59 dB over a wide range of wavelengths across entire C-band.

In another aspect, the present disclosure provides a method for forming a silicon-based polarization beam splitter. In particular, the method includes at least a step of providing a silicon-on-insulator (SOI) substrate having a silicon layer of a thickness. On the SOI substrate, the method is applied with a step of patterning a first isosceles trapezoid shape in the silicon layer, the first isosceles trapezoid shape being characterized by a first parallel side and a second parallel side connected by two tapered sides. The first parallel side and the second parallel side are separated by a length no greater than 100 μm along a line of symmetry bisecting the pair of parallel sides. The first parallel side has a first width being greater than a second width of the second parallel side. Further, the method is applied with a step of forming a first plate structure having the same thickness of the silicon layer substantially based on the first isosceles trapezoid shape. Furthermore, the method is applied with a step of forming a pair of input ports from the same silicon layer to join with the first plate structure at the first parallel side substantially edge-aligned with respective two tapered sides and forming a pair of output ports from the same silicon layer to join with the first plate structure at the second parallel side substantially edge-aligned with respective two tapered sides.

The SOI substrate is commonly used for fabrication and integration of silicon-photonics circuits to form various kinds of SiPho modules for applications including data communication in a DWDM system with wide band wavelengths such as C-band and O-band. Particularly, as polarized light communication is implemented, a silicon-based polarization beam splitter PBS, like one disclosed herein, is often used in SiPho modules plugged in polarization sensitive silicon photonics circuits. Additionally, the method includes forming a waveguide on the same SOI substrate to couple with respective one of the pair of input ports or the pair of output ports so that the PBS can be integrated directly into the SiPho module. These processes are fully compatible to existing CMOS process based on SOI substrate with standard 220 nm Si layer.

In the embodiment, the step of patterning the first isosceles trapezoid shape includes patterning a tapered shape for each of the pair of input ports joined with the first parallel side and each of the pair of output ports joined with the second parallel side. The tapered shape of each port has a first port width joined with the plate structure being greater than a second port width away from the plate structure.

In the embodiment, the step of the forming the first plate structure includes making the first width of the first parallel side to be no smaller than 2 µm greater than the second width of the second parallel side to be no greater than 2 µm, and making the second parallel side being no more than 50 µm from the first parallel side along a line of symmetry bisecting the pair of parallel sides and the first parallel side.

In the embodiment, the step of the forming the pair of input ports further includes forming a silicon waveguide with a width equal to the second port width from the same silicon layer to join with one input port and terminating another input port. The silicon waveguide is used to provide an input light wave to the first plate structure.

In the embodiment, the step of the forming the pair of output ports further includes forming a pair of silicon waveguides each with a width equal to the second port width from the same silicon layer to join respectively with the pair of output ports. One of the pair of output ports is made to be a cross port relative to the one input port for outputting primarily a TE-mode light wave and another one of the pair of output ports is made to be a bar port relative to the one input port for outputting primarily a TM-mode light wave.

Optionally, the method further includes a step of patterning a second isosceles trapezoid shape and a third isosceles trapezoid shape in the same silicon layer at a same time of patterning the first isosceles trapezoid shape and each tapered shape for each input port and each output port. Moreover, the method includes a step of forming a second plate structure and a third plate structure respectively based on the second isosceles trapezoid shape and the third isosceles trapezoid shape. The second plate structure has one input port coupled to a first output port of the first plate structure and another input port being terminated. The third plate structure has one input port coupled to a second output port of the first plate structure and another input port being terminated.

Optionally, the method further includes a step of forming a first pair of output ports coupled to the second plate structure which is substantially similar to the first plate structure. The method also includes a step of forming one of the first pair of output ports that is a cross port relative to the first output port of the first plate structure being configured to output primarily the TE mode light wave with a two-stage extinction ratio at least greater than 60 dB. Furthermore, the method also includes a step of forming a second pair of output ports coupled to the third plate structure which is substantially similar to the first plate structure. The method further includes forming one of the second pair of output ports that is a bar port relative to the second output port of the first plate structure being configured to output primarily the TM mode light wave with a two-stage extinction ratio at least greater than 60 dB In yet another aspect, the present disclosure provides a silicon-photonics module to be deployed for DWDM communication system. The silicon-photonics module includes the polarization beam splitter (PBS) based on silicon 2×2 MMI formed on a standard 220 nm SOI platform. Optionally, the silicon-photonics module includes passive components like multiplexer or demultiplexer, polarization rotator, polarization splitter, etc. Optionally, the silicon-photonics circuit includes components like modulator, coupler, phase shifter etc. that are coupled to active devices (laser or photodetector) for transmitting or receiving optical signals in a wide band or converging the optical signals to electrical signals. Optionally, the wide band can be C-band from 1530 nm to 1560 nm. Optionally, the wide band can be O-band from 1270 nm to 1330 nm. The PBS described herein is characterized by a silicon plate structure formed on the SOI substrate with an isosceles trapezoid shape. A first parallel side and a second parallel side of the isosceles trapezoid shape are connected by two tapered sides. The first parallel side and the second parallel side are separated by a length no greater than 100 µm along a line of symmetry bisecting the pair of parallel sides and the first parallel side. The first parallel side has a first width being greater than a second width of the second parallel side. A PBS with an optimized compact dimension has the length no greater than 50 µm and the first width is slightly greater than 2 µm and the second width is slightly smaller than 2 yielding a <1 dB transmission loss for TE-mode and TM-mode light wave split by the PBS respectively to a cross port and a bar port relative to an input port. At the same time, the PBS yields lower than 33 dB in reflection loss for either TE-mode reflection or TM-mode reflection. Optionally, when two-stage cascaded PBS is employed, the extinction ratio of greater than 60 dB can be achieved.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A polarization beam splitter comprising:
   a silicon-on-insulator substrate comprising a layer of silicon having a uniform thickness deposited on an insulating layer of the silicon-on-insulator substrate;
   a waveguide including a planar structure formed from the layer of silicon on the silicon-on-insulator substrate, the planar structure having the uniform thickness and a shape of an isosceles trapezoid;
   first and second input ports formed from the layer of silicon on the silicon-on-insulator substrate, the first and second input ports being respectively located proximate to first and second corners of the isosceles trapezoid along a first side of the isosceles trapezoid, one of the first and second input ports receiving an input including a Transverse Electric (TE) mode light wave and a Transverse Magnetic (TM) mode light wave; and
   first and second output ports formed from the layer of silicon on the silicon-on-insulator substrate, the first and second output ports being respectively located proximate to third and fourth corners of the isosceles trapezoid along a second side of the isosceles trapezoid, the second side being parallel to and shorter in length than the first side, the first side being spaced apart from the second side by a distance at which two or more orders of the TE mode light wave propagate through the planar structure and converge in phase at the first output port and two or more orders of the TM mode light wave scatter through the planar structure and converge in phase at the second output port.

2. The polarization beam splitter of claim 1, wherein the uniform thickness of the planar structure is 220 nm, and wherein the distance between the first and second sides and lengths of the first and second sides are selected along with the uniform thickness of the planar structure to operate the polarization beam splitter in C-band.

3. The polarization beam splitter of claim 1, wherein the planar structure comprises a silicon-based multi-mode interferometer characterized by the shape of the isosceles trapezoid with the distance between the first and second sides being no greater than 80 µm, and a first length of the first side being no greater than 5 µm.

4. The polarization beam splitter of claim 1, wherein the planar structure is characterized by the isosceles trapezoid shape with the distance between the first and second sides being no greater than 70 µm and a first length of the first side being no greater than 4 µm.

5. The polarization beam splitter of claim 1, wherein the planar structure is characterized by the isosceles trapezoid shape with the distance between the first and second sides being no greater than 60 µm and a first length of the first side being no greater than 3 µm.

6. The polarization beam splitter of claim 1, wherein the planar structure is characterized by the isosceles trapezoid shape with the distance between the first and second sides being no greater than 50 µm and a first length of the first side being about 2 µm.

7. The polarization beam splitter of claim 1, wherein the planar structure having the uniform thickness and the shape of the isosceles trapezoid is configured to output the TE-mode light wave for any wavelength in C-band primarily to the first output port with a power loss less than 1 dB, the first output port being a cross port relative to the one of the first and second input ports receiving the input, and to output the TM-mode light wave for any wavelength in C-band primarily to the second output port with a power loss less than 1 dB, the second output port being a bar port relative to the one of the first and second input ports receiving the input, wherein another of the first and second input ports that does not receive the input is terminated.

8. The polarization beam splitter of claim 1, wherein the planar structure having the uniform thickness and the shape of the isosceles trapezoid causes the TE-mode light wave at the first output port to comprise a clear self-image of TE-mode light wave in the input and causes the TM-mode light wave at the second output port to comprise a clear self-image of TM-mode light wave in the input.

9. The polarization beam splitter of claim 1, wherein the planar structure having the uniform thickness and the shape of the isosceles trapezoid is configured to provide a substantially reduced output of the TE-mode light wave for any wavelength in C-band to the second output port with a reflection power loss greater than −13 dB, and to provide a substantially reduced output of the TM-mode light wave for any wavelength in C-band to the first output port with a reflection power loss greater than −20 dB.

10. The polarization beam splitter of claim 1, wherein the planar structure having the uniform thickness and the shape of the isosceles trapezoid is configured to provide a substantially reduced reflection of the TE-mode light wave for any wavelength in C-band back to the one of the first and second input ports with a reflection power loss greater than −33 dB, and to provide a substantially reduced reflection of the TM-mode light wave for any wavelength in C-band back to the one of the first and second input ports with a reflection power loss greater than −59 dB.

11. The polarization beam splitter of claim 1 wherein:
the planar structure having the uniform thickness and the shape of the isosceles trapezoid causes the two or more orders of the TE mode light wave to converge in phase initially at a first point adjacent to a first slanting side of the isosceles trapezoid and subsequently at the first output port;
the planar structure having the uniform thickness and the shape of the isosceles trapezoid causes the two or more orders of the TM mode light wave to converge in phase initially at a second point adjacent to a second slanting side of the isosceles trapezoid and subsequently at the second output port; and
the first and second points are offset relative to each other along an axis parallel to the first and second sides of the isosceles trapezoid.

12. The polarization beam splitter of claim 11 wherein the offset between the first and second points, the distance between the first and second sides of the isosceles trapezoid, and a slope of the first and second slanting sides of the isosceles trapezoid slanting from the first and second input ports towards the first and second output ports are correlated to each other so that the two or more orders of the TE and TM mode light waves respectively converge in phase at the first and second outputs.

13. The polarization beam splitter of claim 1 wherein each of the first and second input ports and the first and second output ports has a trapezoidal shape, a longer of two parallel sides of the trapezoidal shape of the first and second input ports being joined to the first side of the isosceles trapezoid at the first and second corners, and a longer of two parallel sides of the trapezoidal shape of the first and second output ports being joined to the first side of the isosceles trapezoid at the third and fourth corners.

14. The polarization beam splitter of claim 1 wherein the first and second input ports, the first and second output ports, and the planar structure have the uniform thickness.

15. The polarization beam splitter of claim 1 wherein the first and second input ports, the first and second output ports, and the planar structure are formed on the silicon-on-insulator substrate using a same set of one or more fabrication steps.

* * * * *